Figure 1:
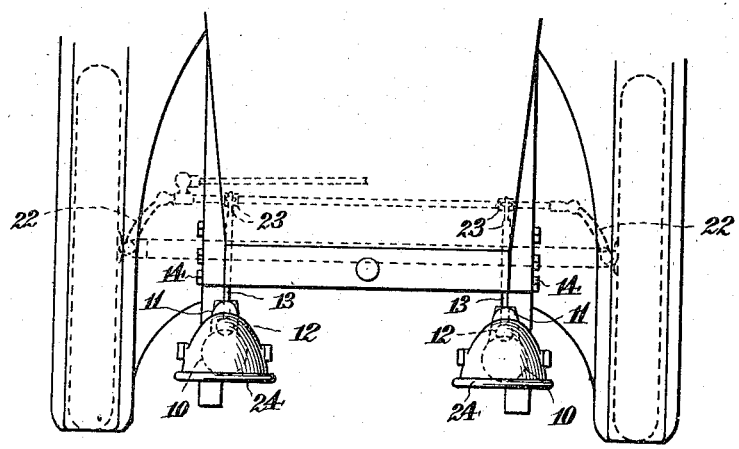

F. C. KIEFER.
HEADLIGHT ADJUSTING MECHANISM FOR AUTOMOBILES.
APPLICATION FILED NOV. 27, 1915.

1,174,873.

Patented Mar. 7, 1916.
2 SHEETS—SHEET 1.

Witnesses:

Inventor,
Frederick C. Kiefer.
By Victor J. Evans,
Attorney.

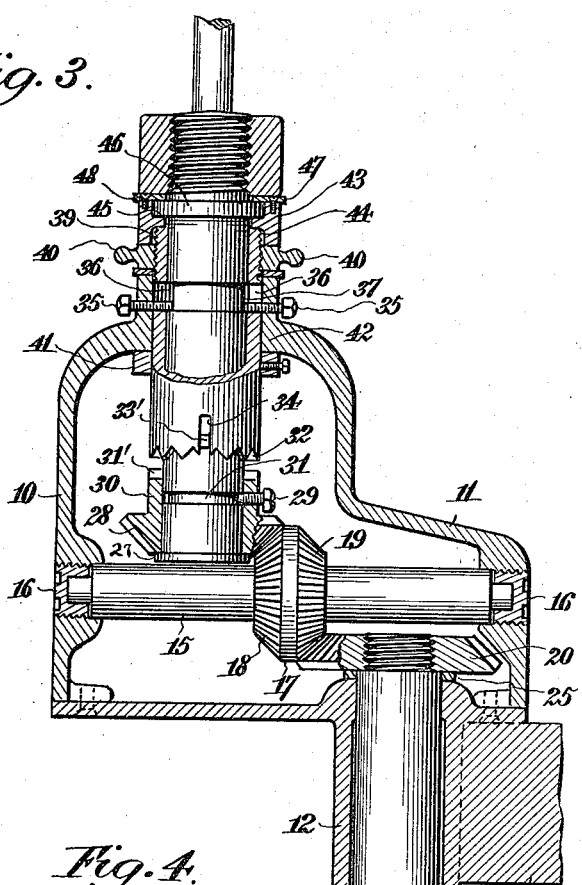
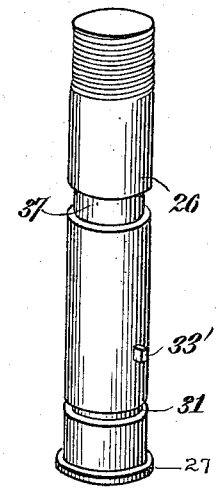
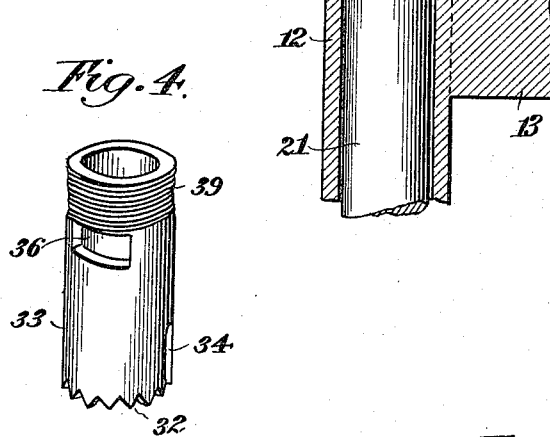

UNITED STATES PATENT OFFICE.

FREDERICK C. KIEFER, OF RIDGEFIELD PARK, NEW JERSEY.

HEADLIGHT-ADJUSTING MECHANISM FOR AUTOMOBILES.

1,174,873. Specification of Letters Patent. Patented Mar. 7, 1916.

Application filed November 27, 1915. Serial No. 63,783.

*To all whom it may concern:*

Be it known that I, FREDERICK C. KIEFER, a citizen of the United States, residing at Ridgefield Park, in the county of Bergen and State of New Jersey, have invented new and useful Improvements in Headlight-Adjusting Mechanism for Automobiles, of which the following is a specification.

This invention comprehends the provision of a headlight for motor vehicles, which may be readily associated with the steering mechanism and controlled thereby, so that the light will be automatically moved to either the right or left, upon turning of the front wheels, with a view of illuminating the roadway in advance of the machine.

In carrying out my invention I provide a construction whereby the said headlight, may be locked in a fixed position when not in use, such as for instance during the day, and readily and easily adjusted into operative association with the steering mechanism when its use is desired.

Another important object of the invention resides in the provision of a construction of a device of the above mentioned character, wherein all the parts of the mechanism are inclosed within a casing, to exclude dust, dirt or other foreign matter which would obviously interfere with the efficiency of the device.

The nature and advantages of the invention will be better understood when the following description is read in connection with the accompanying drawings, the invention residing in the construction, combination and arrangement of parts outlined in the claims.

In the drawings forming part of this specification like numerals of reference indicate similar parts throughout the several views and wherein:—

Figure 2:
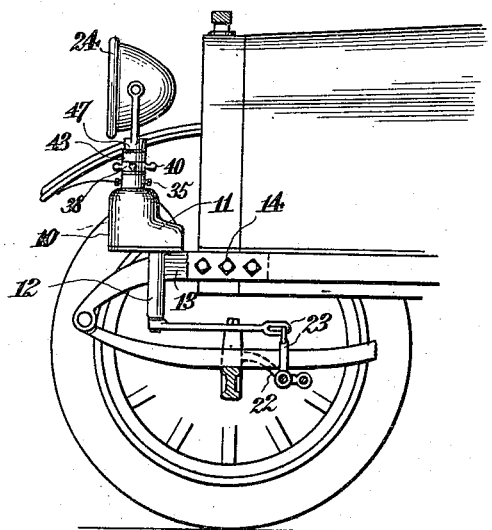

Figure 1 is a plan view showing the manner of mounting the lamp upon the vehicle, and its association with the adjusting mechanism. Fig. 2 is a side elevation. Fig. 3 is an enlarged vertical sectional view. Fig. 4 is a detail perspective view of the sleeve. Fig. 5 is a similar view of the support for the lamp.

Before entering into a detail description of the preferred embodiment of the invention herein illustrated, I desire to have it understood that I do not limit myself to the precise construction, as various changes may be resorted to when desired, as fall within the scope of the appended claims.

In carrying out the invention I make use of a casing 10 which may be constructed from any suitable material and preferably of the design shown, including the extension 11 and depending sleeve-like portion 12, the latter being provided with attaching flanges 13 for the purpose of securing the casing to the frame of the automobile in any suitable manner preferably by means of the fastening elements 14. The front wall of the casing 10 and end wall of the extension 11 are provided with alined openings in which is journaled the horizontal shaft 15 held in proper position by means of suitable nuts 16 secured within the said opening. Keyed or otherwise fixed upon the shaft 15 is a duplex gear 17 the side 18 of which is operatively associated with the lamp support, in the manner to be hereinafter described, while the side 19 of said gear meshes with a bevel gear 20 carried upon the upper end of the shaft 21 that projects through the sleeve-like portion 12 of the casing. The lower end of the shaft 21 is connected with the steering knuckle 22 of the machine by means of a plurality of pivotally connected links 23 which are so arranged that when the front wheels of the machine are turned either to the right or to the left, a rotary movement is imparted to the shaft 21 in the proper direction to move the lamp 24 laterally, through the medium of the gearing between the shaft 21 and the lamp support, so that the light rays will be constantly maintained in advance of the progressive movements of the machine with a view of properly illuminating the roadway. While the gear 20 may be connected in any suitable manner with the shaft 21, the latter is preferably provided with a reduced threaded end portion which is screwed into a suitable opening in the said gear, a washer 25 being interposed between the gear 20 in the adjacent wall of the frame 10.

Supporting the lamp 24 is a post 26 having a flange 27 at one end upon which is supported a bevel gear 28 which meshes with the side 18 of the duplex gear 17 as shown. This gear is loosely mounted upon the post 26 and is held operatively associated therewith by means of set screws or the like 29 passed through the collar 30 rising from said gear and into an annular groove 31 formed in the post adjacent its lower end. The upper edge of the collar 30 is formed to provide a clutch surface 31' adapted to coöperate with a similar clutch surface 32 formed on the adjacent end of a sleeve 33 to hold these parts fixed relatively upon one of the adjusted positions of said sleeve, it being understood that the sleeve is mounted upon the post 26 for sliding movement. A pin 33' projects from the post 26 through an elongated slot 34 in the sleeve, so that when the sleeve and collar 30 are operatively associated for rotation, the post 26 is also rotated through the medium of the slot and pin connection, for the purpose of turning the lamp in the proper direction. The sleeve is held operatively positioned upon the post 26 by means of set screws, pins or the like indicated at 35, the latter passing through the upper portion of the casing 10, through elongated slots 36 formed in the sleeve, and entering an annular groove 37 in the post.

With a view of holding the lamp stationary when its use is not desired, such as for instance during the day, I employ a wheel 38 in the nature of a ring which is interiorly threaded for operative association with the exteriorly threaded portions 39 of the sleeve. Projecting radially from the wheel 38 is a plurality of handles 40 by means of which the wheel may be rotated to effect a sliding adjustment of the sleeve 32 upon the post 26. When the wheel is rotated in one direction the sleeve is moved upwardly upon the post out of engagement with the clutch 30, and by reason of the fact that the clutch 30 is loosely mounted upon the post 26, it is manifest that the operation of the steering mechanism in no way affects the position of the lamp 24. Fixed upon the sleeve in any suitable manner is an annulus 41 functionating in the capacity of a stop adapted to abut against the portion 42 of the casing to limit the adjustment of the sleeve upon the post in an upward direction.

Embracing the post 26 is a collar 43 arranged immediately above the operating wheel 38, the collar being adapted to hold the wheel in proper position, and having a portion cut away as at 44, to permit the sleeve to move upwardly upon the post 26. The collar is further formed to provide a shoulder 45 upon which is seated a ring 46, while arranged above the collar 43 and resting thereon is a washer 47 secured to the collar in any suitable manner preferably by means of the fastening elements 48.

By reason of the construction hereinabove set forth it will be clear that by rotating the wheel 38 the sleeve 32 may be quickly and easily moved into or out of engagement with the clutch 30 for the purposes intended, without disturbing any other part of the device or the machine.

It is to be further noted that the entire mechanism for controlling the movements of the lamp is wholly inclosed within the casing 10, thereby eliminating considerable trouble as the result of dirt, mud or other foreign matter lodging between the various parts of the mechanism.

The device is extremely simple in construction, and may be arranged upon any machine without altering the latter.

What is claimed is:—

1. A lamp for automobiles comprising in combination with the steering mechanism of the machine, a casing, a shaft journaled therein, a bearing depending from the casing, a second shaft journaled in said bearing and having one end connected with the steering mechanism, the opposite end of said shaft projecting into said casing and operatively associated with said first mentioned shaft for rotating the latter under the control of said steering mechanism, and a lamp support extending from within said casing and operatively connected with the first mentioned shaft for the purpose set forth.

2. A lamp for automobiles comprising in combination with the steering mechanism of the machine, a casing, a shaft journaled therein, a bearing depending from said casing, a second shaft journaled in said bearing and having one end connected with the steering mechanism and its opposite end operatively associated with the shaft within the casing, to rotate the latter under control of the steering mechanism, a lamp support rising from within said casing, means for moving said lamp laterally in either direction including a pair of clutch engaging members fitted upon said support, one of said members having connection with said first mentioned shaft for rotation therewith, and means for separating said members whereby said lamp may be held stationary.

3. A lamp for automobiles comprising in combination with the steering mechanism of the machine, a casing, a shaft journaled therein, means for rotating said shaft under the control of said steering mechanism, a lamp support projecting from within said casing, a clutch member arranged upon the inner end of said support for rotation and operatively associated with said shaft, a second clutch member slidably mounted upon the support and adapted to be moved into and out of engagement with the first mentioned clutch member, and a connection between said adjustable clutch member and the support for rotating the latter upon rotation of said shaft.

4. A lamp for automobiles comprising in combination with the steering mechanism, a casing, a shaft journaled therein, means for rotating said shaft under the control of said steering mechanism, a lamp support projecting from within said casing, a pair of clutch engaging members mounted on the support, one of said members being loosely mounted thereon and having connection with the shaft for rotation therewith, the other of said members being exteriorly threaded, a collar threadedly associated therewith for adjusting said member into and out of engagement with the first mentioned member, and a connection between the adjustable member and said support for rotating the latter upon rotation of the shaft.

5. A lamp for automobiles comprising in combination with the steering mechanism of the machine, a casing, a shaft journaled therein, means for rotating said shaft under the control of the steering mechanism, a lamp support projecting from within said casing, means for rotating said support upon rotation of the shaft including a pair of clutch members, one of said members being loosely mounted upon the support and connected with the shaft for rotation therewith, a lug projecting from said support, and the other of said members being slidably adjustable upon said support and provided with a slot for the reception of said lug.

6. A lamp for automobiles comprising in combination with the steering mechanism of the machine, a casing, a shaft journaled therein, a duplex gear fixed upon said shaft, a bearing member depending from said casing, a second shaft journaled in said bearing and having one end connected with the mechanism, a beveled gear on the opposite end of said shaft meshing with one side of said duplex gear, a lamp support rising from within said casing, a beveled gear on one end of the support operatively associated with the opposite side of the said duplex gear, means for partially rotating said support upon rotation of the first mentioned shaft, and means for holding said lamp stationary independently of said shaft.

In testimony whereof I affix my signature in presence of two witnesses.

FREDERICK C. KIEFER.

Witnesses:
  THOS. R. ARDEN,
  JOS. S. WIGGINS.

Copies of this patent may be obtained for five cents each, by addressing the "Commissioner of Patents, Washington, D. C."